United States Patent
Ma et al.

(10) Patent No.: US 8,836,538 B2
(45) Date of Patent: Sep. 16, 2014

(54) PARKING GUIDANCE SYSTEM

(75) Inventors: Guanglin Ma, Shanghai (CN); Chong Sun, Shanghai (CN); Ran Li, Shanghai (CN)

(73) Assignee: Delphi Technologies, Inc., Troy, MI (US)

( * ) Notice: Subject to any disclaimer, the term of this patent is extended or adjusted under 35 U.S.C. 154(b) by 252 days.

(21) Appl. No.: 12/887,872

(22) Filed: Sep. 22, 2010

(65) Prior Publication Data

US 2011/0181441 A1    Jul. 28, 2011

(30) Foreign Application Priority Data

Jan. 26, 2010    (CN) ..................... 2010 2 0109799 U (51) Int. Cl.
  *B60Q 1/48*    (2006.01)
  *G08G 1/14*    (2006.01)
  *B62D 15/02*    (2006.01)
  *B60R 1/00*    (2006.01)

(52) U.S. Cl.
  CPC ....... *B62D 15/0275* (2013.01); *B60R 2300/806* (2013.01); *B60R 1/00* (2013.01)
  USPC ..................... 340/932.2; 340/988; 340/425.5; 340/435; 340/436

(58) Field of Classification Search
  None
  See application file for complete search history.

(56) References Cited

U.S. PATENT DOCUMENTS

2010/0013670 A1    1/2010    Hueppauff et al.
2011/0102196 A1    5/2011    Kadowaki

FOREIGN PATENT DOCUMENTS

| EP | 1502815 | | 2/2005 |
|---|---|---|---|
| EP | 1642808 | | 4/2006 |
| EP | 1642808 | A1 * | 4/2006 |
| EP | 1707474 | | 10/2006 |
| WO | 2009044513 | | 4/2009 |
| WO | 2009147920 | | 12/2009 |

OTHER PUBLICATIONS

European Search Report dated May 11, 2011.

* cited by examiner

*Primary Examiner* — Travis Hunnings
(74) *Attorney, Agent, or Firm* — J. Gordon Lewis (57) ABSTRACT

The present application discloses a parking guidance system. The parking guidance system is mounted on a vehicle and includes a camera, a display device with a display correction system, a parking mode selection apparatus, a parking area selection apparatus, a first turning guidance apparatus, and a second turning guidance apparatus. The camera is mounted at the rear of the vehicle to capture the image showing environment behind the vehicle. The display device with a display correction system is coupled to the camera and is configured to display an image corrected by the display correction system. The parking mode selection apparatus is coupled to the display device. The parking mode selection apparatus displays a predicted parking area on the display device. The parking area selection apparatus is coupled to the display device. The parking area selection apparatus displays a parking guidance area on the display device. The first turning guidance apparatus is coupled to the display device. The first turning guidance apparatus displays an arc on the display device. The second turning guidance apparatus is coupled to the display device. The second turning guidance apparatus displays on the display device a parking track with distance indication.

13 Claims, 10 Drawing Sheets

PARKING GUIDANCE SYSTEM

FIELD OF THE INVENTION

The present invention relates to automobile components, and more specifically, to a parking guidance system for assisting parking.

BACKGROUND

Parallel parking (street parking) and angle parking (enter a vertical or angled parking lot), the most common ways of parking, are widely employed in daily life. Many parking lots on the road are based on the parallel parking, whereas the parking lots in residential areas, shopping centers, etc., are based typically on the angle parking. It is relatively difficult for a driver to park in tight spaces, especially by way of parallel parking. The drivers often feel unable to accurately park the car into the parking spaces especially into the short parking lots located along narrow roads.

Figure 3:
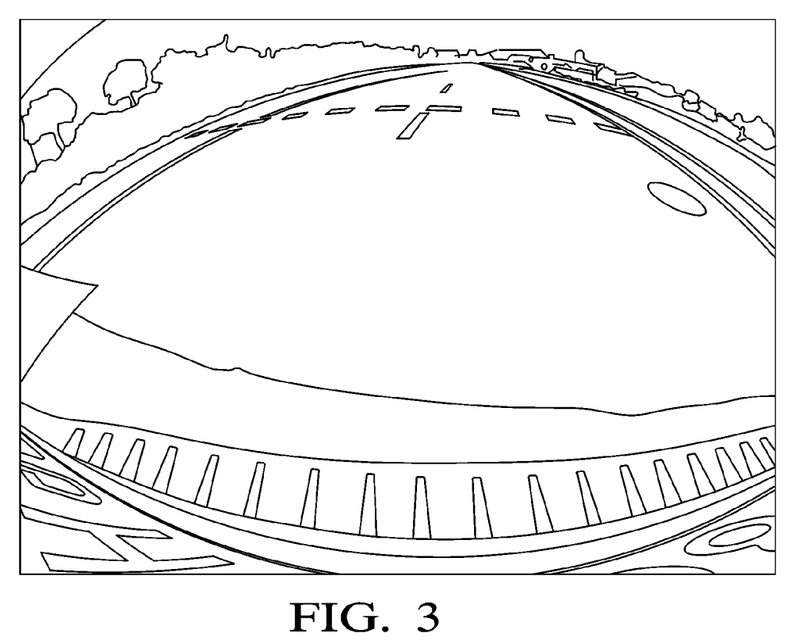
FIG. 3 illustrates an original image captured by a wide-angled camera lens.
Figure 4:
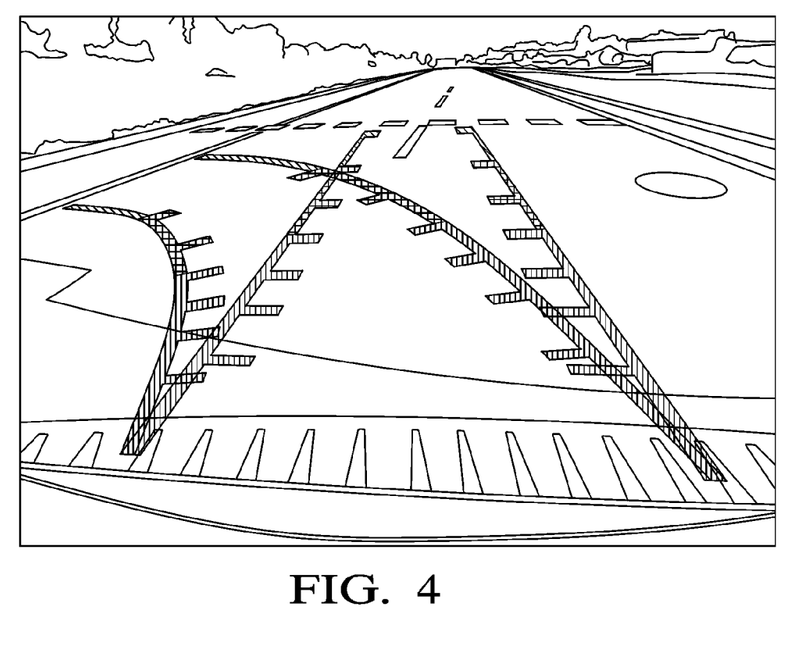
FIG. 4 illustrates a display image which is corrected by the "fisheye distortion correction system" based on an image captured by a wide-angled camera lens.

It is desirable to have an auxiliary parking system which can particularly assist parallel parking. Many of the existing visual parking systems are already equipped with a display correction system. The display correction system can remove the distortion introduced by the wide-angled lens of the camera such that the image displayed is closer to the real situation as would be directly observed by a driver. Such a display correction system is also referred to as a "fisheye distortion correction system". The visual parking system with a correction system provides real rear environment for the driver and considerably assists angle parking. However, such system is currently not helpful in assisting parallel parking. The visual parking system with a correction system has paved the way for auxiliary parallel parking. Drawing FIGS. 3 and 4 illustrate an effect as a result of the usage of the fisheye distortion correction system which corrects the image captured by the wide-angled lens. FIG. 3 is an original image captured by the wide-angled lens, whereas FIG. 4 is an image captured by the "fisheye distortion correction system".

SUMMARY

The present disclosure is directed to a parking guidance system which can not only effectively assist the parallel parking, but assist the angle parking more accurately.

According to one embodiment of the present disclosure, a parking guidance system mounted on a vehicle includes a camera, a display device with a display correction system, a parking mode selection apparatus, a parking area selection apparatus, a first turning guidance apparatus, and a second turning guidance apparatus.

The camera is preferably mounted at the rear of the vehicle to capture the image showing environment behind the vehicle. The display device with a display correction system is coupled to the camera and is configured to display an image corrected by the display correction system. The parking mode selection apparatus is coupled to the display device. The parking mode selection apparatus displays a predicted parking area on the display device, wherein the predicted parking area is polygon. The parking area selection apparatus is coupled to the display device. The parking area selection apparatus displays a parking guidance area on the display device, wherein the parking guidance area is polygon. The first turning guidance apparatus is coupled to the display device. The first turning guidance apparatus displays an arc on the display device. The second turning guidance apparatus is coupled to the display device. The second turning guidance apparatus displays on the display device a parking track with distance indication.

To provide the driver with a more visually intuitive experience, in one embodiment, the parking guidance system may further include a top view display apparatus coupled to the display device and a series of detection devices mounted around the vehicle.

In one embodiment, the predicted parking area is quadrangle. The parking mode selection apparatus further includes a prompt apparatus for detecting an obstacle within the predicted parking area and displaying the predicted parking area in a different color.

In one embodiment, the parking guidance area is quadrangle. The parking area selection apparatus further includes a guidance apparatus for detecting an overlap between the predicted parking area and the parking guidance area, and displaying the parking guidance area in a different color.

In one embodiment, a fisheye distortion correction system is used to correct the image captured by the camera.

According to one embodiment of the present disclosure, a parking guidance system mounted on a vehicle includes a camera, a display device with a display correction system, a parking mode selection apparatus, a first turning guidance apparatus, and a second turning guidance apparatus.

The camera is mounted at the rear of the vehicle to capture the image showing environment behind the vehicle. The display device with a display correction system is coupled to the camera and is configured to display an image corrected by the display correction system. The parking mode selection apparatus is coupled to the display device. The first turning guidance apparatus is coupled to the display device and is configured to display two arcs on the display device. The second turning guidance apparatus is coupled to the display device and is configured to display on the display device a parking track with distance indication.

To provide the driver with a more visual experience, in one embodiment, the parking guidance system may further include a top view display apparatus coupled to the display device and a series of detection devices mounted around the vehicle.

In one embodiment, a fisheye distortion correction system is used to correct the image captured by the camera.

The parking guidance system proposed by the present disclosure guides the vehicle to conduct parallel parking or angle parking by providing a series of signs on the display device. With the guidance of these visual signs, the driver is able to complete the parallel parking or angle parking easily and accurately.

BRIEF DESCRIPTION OF THE DRAWINGS

The foregoing and other features, characters and advantages of the present disclosure will become more readily appreciated by reference to the following description of the embodiments, when taken in conjunction with the accompanying drawings where the same reference sign in the drawings represents the same feature, wherein:

To facilitate understanding of the present disclosure, pictorial depictions of images captured by a camera as well as various effects after the image is processed are presented as drawing figures. The present disclosure will be more readily appreciated with connection to the following figures.

FIGS. 3 and 4 relate to a display correction system, wherein:

FIGS. 5A, 5B, 6A, 6B, 7A, 7B, 8A, 8B, 9A, 9B, 10A, 10B, 11A, 11B, 12A and 12B relate a parallel parking guiding process, in which:

FIGS. 13A, 13B, 14A, 14B 15A, 15B, 16A and 16B illustrate a guiding process for the angle parking, in which:

DETAILED DESCRIPTION

Assistance in Parallel Parking

Figure 1:
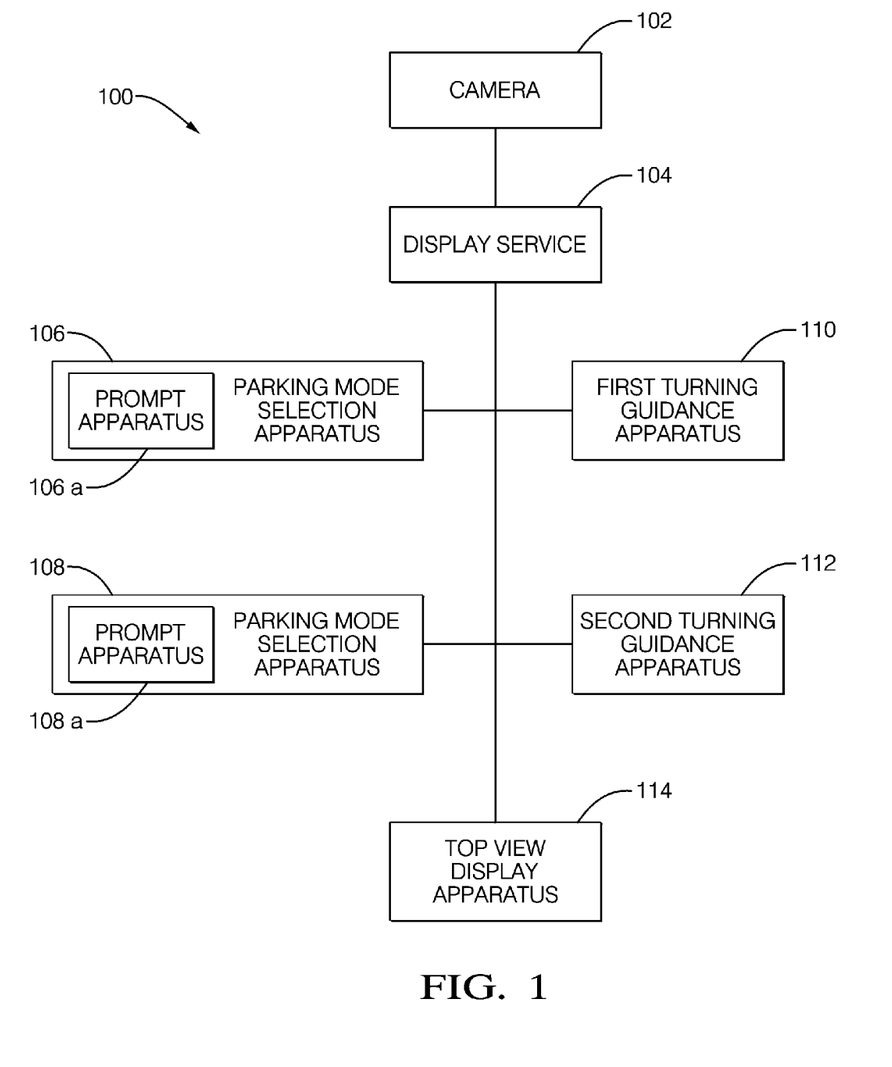
FIG. 1 illustrates a diagram of a parking guidance system according to one embodiment of the present disclosure.

FIG. 1 illustrates a diagram of a parking guidance system 100 according to one embodiment of the present disclosure. Referring to FIG. 1, the parking guidance system 100 includes a camera 102, a display device 104 with a display correction system, a parking mode selection apparatus 106, a parking area selection apparatus 108, a first turning guidance apparatus 110, a second turning guidance apparatus 112, and a top view display apparatus 114. The parking guidance system 100 shown in FIG. 1 is mainly used to assist parallel parking.

The camera 102 is mounted at the rear of the vehicle to capture the image showing environment behind the vehicle.

As best viewed in FIGS. 3 and 4, the display correction system in the display device 104 may be the above-described "fisheye distortion correction system". The display device 104 is coupled to the camera 102 and is configured to display the image captured by the camera 102. After correction by the display correction system, the image displayed on the display device 104 is very close to the real scene as would be perceived directly by a vehicle driver/operator.

The parking mode selection apparatus 106 is coupled to the display device 104. The parking mode selection apparatus 106 supports various parking modes, e.g., parallel parking, angle parking and the like. If the parallel parking mode is selected, the parking mode selection apparatus 106 displays a predicted parking area on the display device 104. The size of the predicted parking area displayed on the display device 104 is a minimum parking area which can be realized by employing the method proposed by the present parking guidance system 100. This area may be a little bit larger compared with the actual area occupied by the vehicle. This is because, considering the track of actual movement, the actual area within which the vehicle moves during the parking process is larger than the actual area occupied by the vehicle. The predicted parking area displayed on the display device 104 is a minimum area for completing the parking process. In one embodiment, the predicted parking area on the display device 104 is represented by a polygon. It is preferred to use a quadrangle to represent the predicted parking area. The parking mode selection apparatus 106 may indicate this polygon on the display device 104 by displaying multiple lines. In one embodiment, the parking mode selection apparatus 106 may display a flag on the corner of the polygon closest to the vehicle. On the one hand, it is easier for the user to discern the predicted parking area on the display device 104. On the other hand, this flag helps to distinguish the predicted parking area from the parking guidance area when the parking starts. If the area to be parked is smaller than this polygon, it means that the area is not large enough to complete the parking. In one embodiment, the predicted parking area rotates in response to the turnings of the steering wheel. On the display device 104, the predicted parking area rotates around the flag displayed.

Occasionally, sufficient area is not available to complete the parking maneuver. If there is an obstacle in the predicted parking area (e.g., other car has been parked in, or obstacles such as stones, trees), the parking can still not be completed safely. As mentioned before, the predicted parking area indicates the area that the parking process may involve. If there is an obstacle in this area, the vehicle will surely encounter this obstacle. Accordingly, in one embodiment of the present invention, the parking mode selection apparatus 106 includes a prompt apparatus 106a. The prompt apparatus 106a may detect the existence of an obstacle in the predicted parking area. The detection of an obstacle in an image captured by a camera is known in the art. The applicant of the present application also discloses, in the utility model application No. CN 200920008222.2, a technique for detecting an obstacle in an image captured by a camera. No matter the technique proposed by the applicant or other technique for detecting an obstacle known in the art, these techniques are all applicable to the prompt apparatus 106a. When there is an obstacle in the predicted parking area, the prompt apparatus 106a may prompt the driver. When there is no obstacle in the predicted parking area, the prompt apparatus 106a may prompt that this area is available for parking now. In one embodiment, the prompt apparatus 106a may conduct prompting with different colors. For instance, when there is an obstacle in the predicted parking area, the prompt apparatus 106a may display the whole predicted parking area in blue. When there is no obstacle in the predicted parking area, the prompt apparatus 106a may display the whole predicted parking area in purple, which indicates that this area is available for parking now. When the predicted parking area is adjusted by using the steering wheel, the predicted parking area may be shown in red.

The parking area selection apparatus 108 is also coupled to the display device 104. The parking area selection apparatus 108 displays a parking guidance area on the display device 104. The parking guidance area corresponds to the predicted parking area displayed by the parking mode selection apparatus 106. In one embodiment, the parking area selection apparatus 108 also supports various parking modes, e.g., parallel parking, angle parking and the like. The main purpose of the parking guidance area is to adjust the start position and start angle of the vehicle. The vehicle can be smoothly parked into the parking slot depending on the start position of the vehicle, such as the distance from the parallel obstacle (other parked car), and depending on whether the starting angle of the vehicle is parallel to the curb. The parking guidance area displayed on the display device 104 by the parking area selection apparatus 108 is also a polygon which corresponds to the polygon associated with the predicted parking area. In one embodiment, these two polygons are the same. The parking guidance area and the predicted parking area can be distinguished by a flag shown on the corner closest to the vehicle. The predicted parking area is displayed with a flag, whereas the parking guidance area does not have this flag.

In one embodiment, the parking area selection apparatus 108 also includes a guidance apparatus 108a for moving the parking guidance area according to the steering by the steering wheel. When the steering wheel turns to a proper angle, the parking guidance area may overlap with the previous predicted parking area. It is to be noted that when the parking guidance area is shown, the predicted parking area is not shown on the display device 104. However, the system may remember the location of the predicted parking area. When the parking guidance area overlaps with the predicted parking area, it means that both of the start position and the start angle of the vehicle are appropriate for starting the parking process. Meanwhile, letter "P" will be displayed in the parking guidance area and the parking guidance area will be displayed in green. When the parking guidance area does not overlap with the predicted parking area, the parking guidance area is displayed in purple, indicating that the start position and the start angle of the vehicle have not been adjusted to the right place.

The first turning guidance apparatus 110 coupled to the display device 104 is configured to guide the vehicle to conduct a first turning or guide the vehicle into the parking lot. The first turning guidance apparatus 110 displays an arc on the display device 104. This arc represents the contour of a side of the vehicle which is closest to the curb. Since the contour of the vehicle is almost straight, or in a slight arc shape in few cases, the radian of this arc is small, approximating a straight line. To provide a noticeable prompt to the driver, the arc may be shown in a bright color. For instance, in one embodiment, the arc may be shown in the noticeable green color. The arc shown by the first turning guidance apparatus 110 may change its position as the vehicle moves. This arc may gradually approach the curb, indicating that the vehicle is approaching the contour near the curb after the vehicle faces front.

The second turning guidance apparatus 112 coupled to the display device 104 is configured to guide the vehicle to conduct a second turning, i.e., a face-front process where part of the vehicle is already in the parking lot. The second turning guidance apparatus 112 displays on the display device 104 a parking track with distance indication. In one embodiment, the parking track may vary as the steering wheel changes its direction. The display of the parking track with distance indication, which varies as the steering wheel changes its direction, is known in the art. Applicant of the present application also discloses, in utility model application No. CN 200920008222.2, a technique for displaying a parking track with distance indication, which varies as the steering wheel changes its direction. No matter the technique proposed by the applicant or other technique for displaying a parking track with distance indication which varies as the steering wheel changes it direction, these techniques are all applicable to the second turning guidance apparatus 112.

To further offer the driver with a visual experience, the parking guidance system 100 also includes a top view display apparatus 114. The top view display apparatus 114 provides a top view image. The top view display apparatus 114 is coupled to the display device 104 and further coupled to a series of detection devices such as radar, camera, which are mounted around the car. The top view display apparatus 114 detects the location and size of the objects near the vehicle, and the size of the space which can be utilized. Then, these are shown on the display apparatus 104 in a top view. The top view display apparatus 114 may also detect the current posture of the vehicle by detecting the angle of the steering wheel. Similarly, this is shown on the display apparatus 104 in a top view. During the movement of the vehicle, the top view display apparatus 114 may display the whole process of the movement of the vehicle in a top view, which offers the driver with a better visual experience.

Parallel Parking Guiding Process

Description is made to the parallel parking guiding process which utilizes the parking guidance system according to the present disclosure with connection to the following drawing figures.

The vehicle is ready to start parallel parking. The camera starts to operate. The display device displays the image showing environment behind the vehicle. The references disclose the images displayed on the display device. In the references, the display screen of the display device is divided into two main sections. The left section displays the image captured by the camera. The right section displays the posture of the vehicle and its neighboring obstacles in a top view by the top view display apparatus. It is to be noted that since the principle of information collection is different, the image captured by the camera reflects an actual scene, whereas the image displayed by the top view display apparatus is an illustrative view.

Figure 5A:
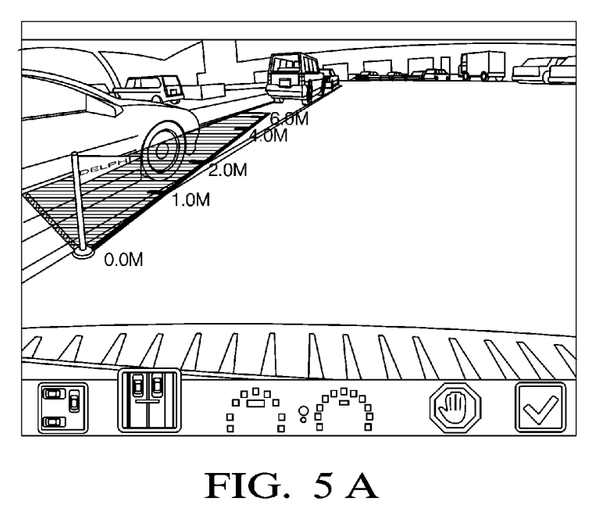
FIG. 5A illustrates the content displayed in a perspective view on a display device when a predicted parking area is being adjusted.
Figure 5B:
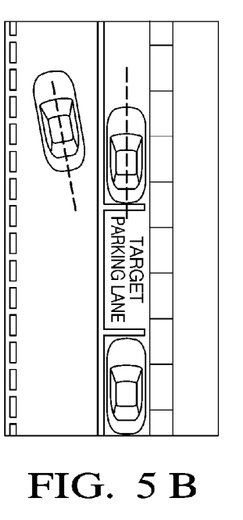
FIG. 5B illustrates the content of FIG. 5A from an overhead perspective.
Figure 6A:
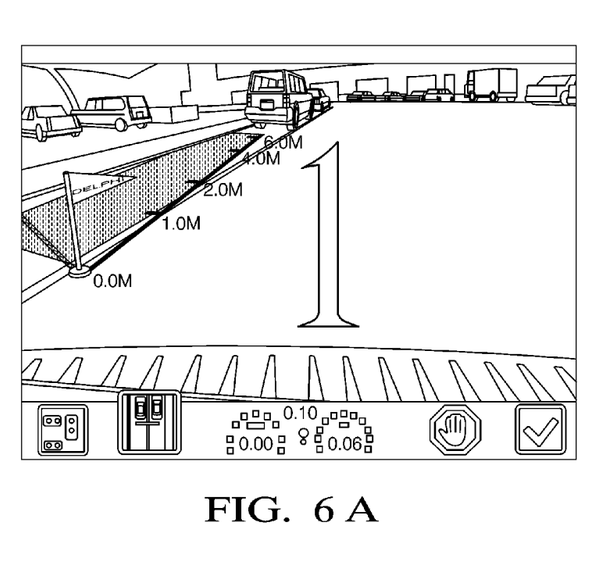
FIG. 6A illustrates the content displayed in a perspective view on a display device when the predicted parking area is available.
Figure 6B:
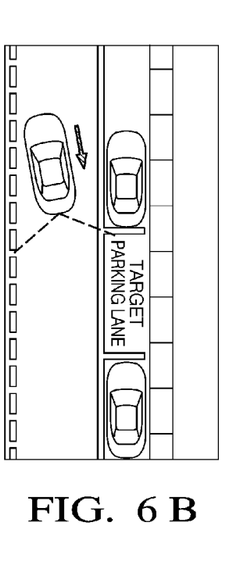
FIG. 6B illustrates the content of FIG. 6A from an overhead perspective.
Figure 7A:
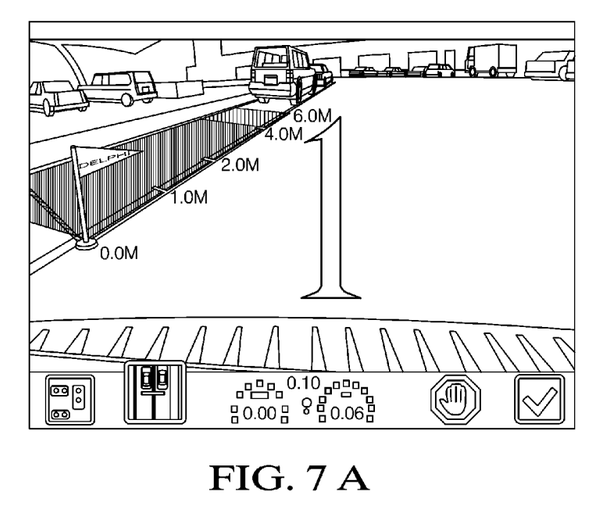
FIG. 7A illustrates the content displayed in a perspective view on a display device when the movement is made within the predicted parking area.
Figure 7B:
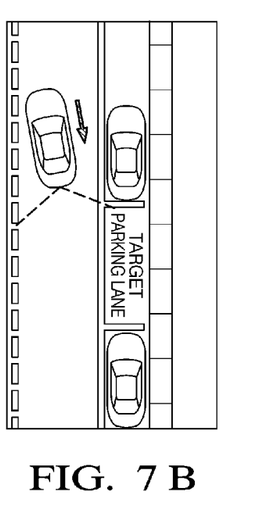
FIG. 7B illustrates the content of FIG. 7A from an overhead perspective.

First, the parking mode selection apparatus starts to work. The selected parking mode is parallel parking mode. The parking mode selection apparatus displays a predicted parking area on the display device. As illustrated in FIGS. 5A and 5B, the size of the predicted parking area is a minimum parking area which can be realized by employing the method proposed by the present parking guidance system. This area may be a little bit larger compared with the actual area occupied by the vehicle (the parking principle of the present parking guidance system will be introduced briefly below). This is because, considering the track of actual movement, the actual area within which the vehicle moves during the parking process is larger than the actual area occupied by the vehicle. The predicted parking area is represented by a polygon. In FIGS. 5A and 5B, a blue quadrangle is used to indicate the predicated parking area. A flag is also shown on the corner of the quadrangle closest to the vehicle. On the one hand, this flag makes it easier for the user to discern the predicted parking area on the display device. On the other hand, this flag helps to distinguish the predicted parking area from the parking guidance area when the parking starts. The prompt apparatus starts to work then. It detects if there is an obstacle in the predicted parking area. At the beginning, the predicted parking area is shown in blue, which means that this area has not been confirmed yet and the parking process cannot be started. If the prompt apparatus confirms that the predicted parking area is available, the prompt apparatus will show the predicted parking area in purple, as illustrated in FIGS. 6A and 6B. The predicted parking area may rotate in response to the turnings of the steering wheel. On the display device, the predicted parking area rotates around the flag displayed. When the predicted parking area is adjusted by using the steering wheel, the predicted parking area may be shown in red, as illustrated in FIGS. 7A and 7B. In the vehicle adjusting process, the top view display apparatus may display corresponding images on the display device. In FIGS. 5A, 5B, 6A, 6B, 7A and 7B, the top view display section on the right of the display screen always displays the current posture of the vehicle and the position relative to the neighboring obstacle.

Figure 8A:
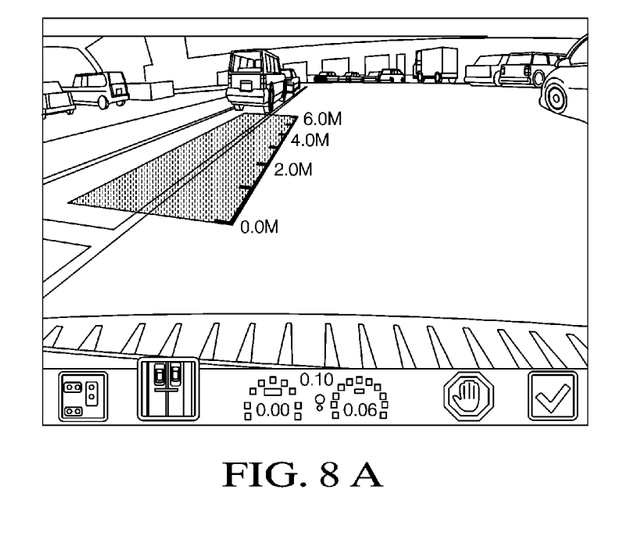
FIG. 8A illustrates the content displayed in a perspective view on a display device when a parking guidance area is being adjusted.
Figure 8B:
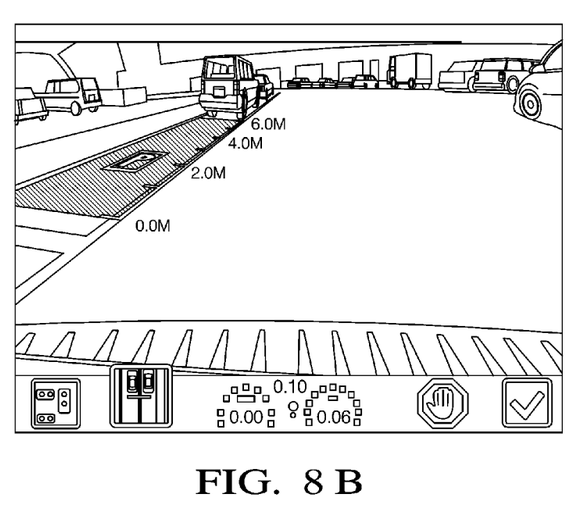
FIG. 8B illustrates the content displayed on a display device when the parking guidance area is available.

Subsequently, the parking area selection apparatus starts to work. The parking area selection apparatus displays a parking guidance area on the display device. The parking guidance area corresponds to the predicted parking area displayed by the parking mode selection apparatus. As illustrated in FIG. 8A, the parking guidance area displayed on the display device by the parking area selection apparatus is also a polygon which corresponds to the polygon regarding the predicted parking area. In a common situation, the predicted parking area and the parking guidance area are the same. The parking guidance area and the predicted parking area may be distinguished by a flag shown on the corner closest to the vehicle. The predicted parking area is displayed with a flag, whereas the parking guidance area does not have this flag. The guidance apparatus in the parking area selection apparatus moves the parking guidance area according to the steering of the steering wheel. When the steering wheel turns to a proper angle, the parking guidance area may overlap with the previous predicted parking area. When the parking guidance area overlaps with the predicted parking area, it means that both of the start position and the start angle of the vehicle are appropriate for starting the parking process. Meanwhile, letter "P" will be displayed in the parking guidance area and the parking guidance area will be displayed in green, as illustrated in FIG. 8B. When the parking guidance area does not overlap with the predicted parking area, the parking guidance area is displayed in purple, indicating that the start position and the start angle of the vehicle have not been adjusted to the right place. As shown in FIG. 8A, the parking guidance area has not overlapped with the predicted parking area yet and the parking guidance is shown in purple.

Figure 9A:
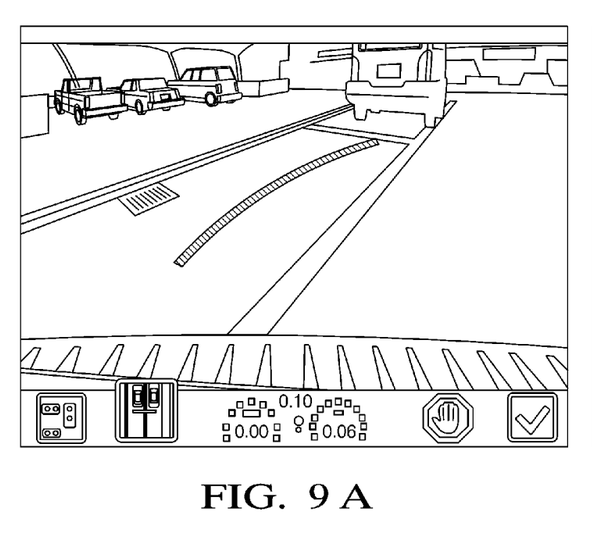
FIGS. 9A and 10A illustrate the content displayed in a perspective view on a display device when a first turning guidance apparatus is operating.
Figure 9B:
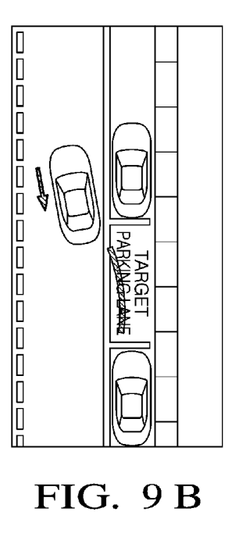
FIG. 9B illustrates the content of FIG. 9A from an overhead perspective.
Figure 10A:
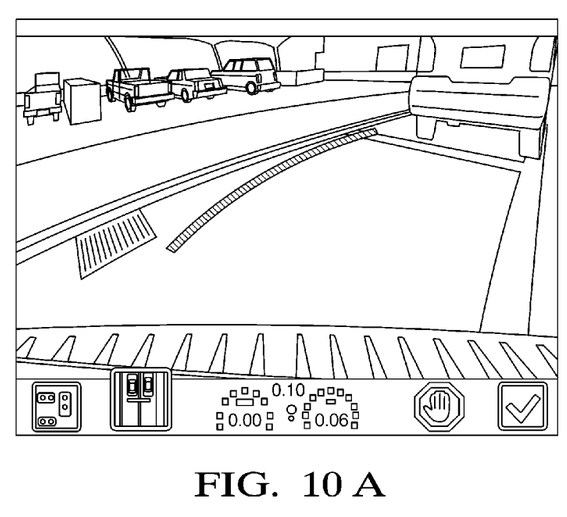
Figure 10B:
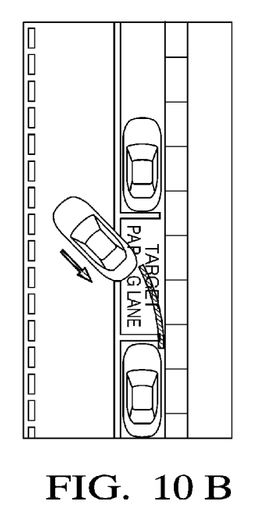
FIG. 10B illustrates the content of FIG. 10A from an overhead perspective.

Then, the first turning guidance apparatus starts to work. The first turning guidance apparatus guides the vehicle to conduct a first turning, i.e., a process of parking the vehicle into the parking lot. As illustrated in FIGS. 9A and 9B, the first turning guidance apparatus displays a green arc on the display device. This arc represents the contour of a side of the vehicle which is closest to the curb. The noticeable green arc may give a sufficient prompt to the driver. In the movement of the vehicle, the green arc may change its position as the vehicle moves. This arc may gradually approach the curb. It is to be noted that the green arc is not the current position where the real contour of the vehicle locates. Rather, it is a prediction of the position where the contour of the vehicle which is close to the curb locates, after the vehicle faces front. For the driver, before the green arc touches the curb, the driver should keep the steering wheel at its utmost turning angle and should not revert back to the center. When the green arc touches the curb, it indicates that a first stage for the parking process is completed. The driver needs to revert the steering wheel back to the center and turn the steering wheel reversely to the utmost turning angle. FIGS. 10A and 10B disclose the situation when the green arc touches the curb. In this process, the top view display apparatus displays on the display device the current posture of the vehicle and its surrounding obstacles. The top view display apparatus similarly displays a top view of the green arc on the display screen in order to offer the driver with a more clear and comprehensive information.

Figure 11A:
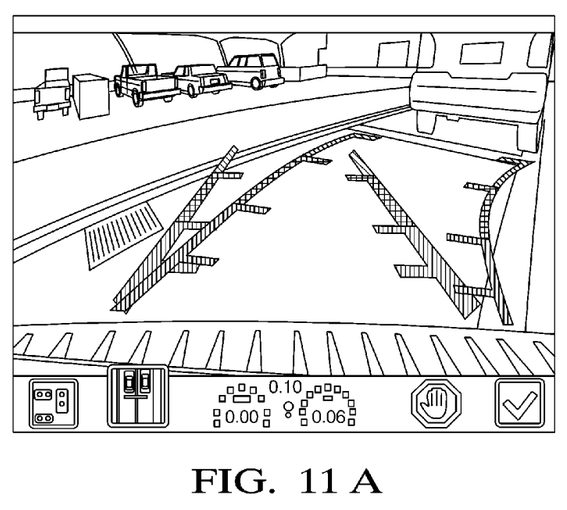
FIGS. 11A and 12A illustrate the content displayed in a perspective view on a display device when a second turning guidance apparatus is operating.
Figure 11B:
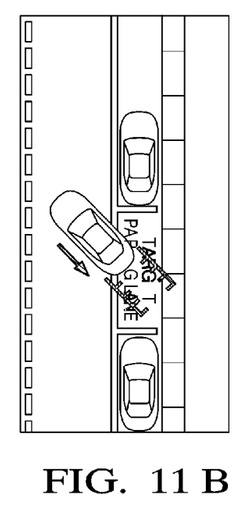
FIG. 11B illustrates the content of FIG. 11A from an overhead perspective.
Figure 12A:
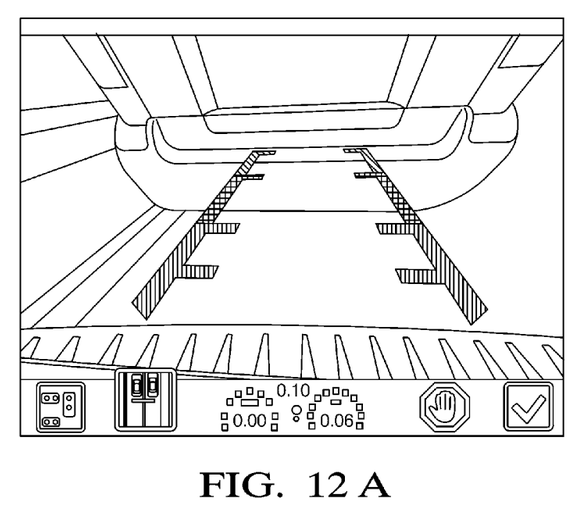
Figure 12B:
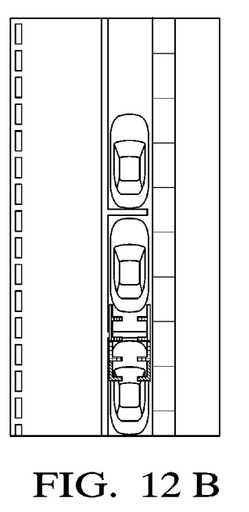
FIG. 12B illustrates the content of FIG. 12A from an overhead perspective.

The last step is to adjust the posture of the vehicle to complete the parking. At that time, the second turning guidance apparatus starts to work. The second turning guidance apparatus guides the vehicle to conduct a second turning, i.e., a face-front process where part of the vehicle is already in the parking lot. The second turning guidance apparatus displays on the display device a parking track with distance indication. As illustrated in FIGS. 11A and 11B, the parking track may vary as the steering wheel changes its direction. The dashed parking track (in straight line) indicates a straight direction of the rear part of the vehicle, while the solid parking track (in curve) indicates the movement track corresponding to the current direction of the steering wheel. As illustrated in FIGS. 12A and 12B, the vehicle has completed the face-front process and succeeds in parking the car into the parking lot. In this process, the top view display apparatus displays the current posture of the vehicle and its surrounding obstacles. The top view display apparatus also displays a top view of the parking track on the display screen in order to offer the driver with a more clear and comprehensive information.

Angle Parking Guidance

Figure 2:
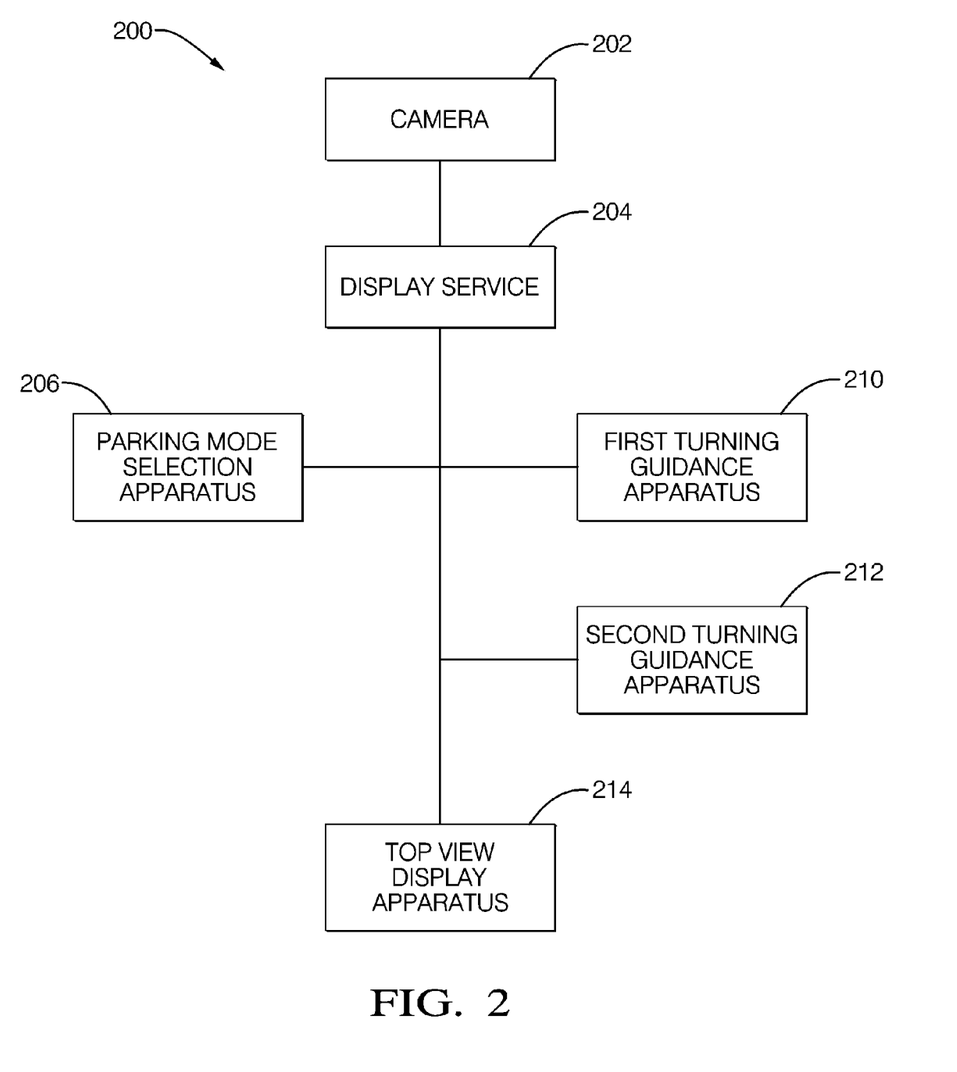
FIG. 2 illustrates a diagram of a parking guidance system according to another embodiment of the present disclosure.

FIG. 2 illustrates a diagram of a parking guidance system 200 according to another embodiment of the present disclosure. Referring to FIG. 2, the parking guidance system 200 includes a camera 202, a display device 204 with a display correction system, a parking mode selection apparatus 206, a first turning guidance apparatus 210, a second turning guidance apparatus 212, and a top view display apparatus 214. The parking guidance system 200 shown in FIG. 2 is mainly used to assist angle parking.

The camera 202 is mounted at the rear of the vehicle to capture the image showing environment behind the vehicle.

As best viewed in FIGS. 3 and 4, the display correction system in the display device 204 may be the above-described "fisheye distortion correction system". The display device 204 is coupled to the camera 202 and is configured to display the image captured by the camera 202. After correction by the display correction system, the image displayed on the display device 204 is very close to the real scene as would be perceived directly by a vehicle driver/operator.

The parking mode selection apparatus 206 is coupled to the display device 204. The parking mode selection apparatus 206 supports various parking modes, e.g., parallel parking, angle parking and the like. If angle parking mode is selected (suitable for angled parking lot or right angled/vertical parking lot), the parking mode selection apparatus 206 may immediately guide the first turning guidance apparatus 210 into a working status. Because the angled or vertical parking space is generally enough for parking, there is no need to detect the parking space like the parallel parking does. If the space is clearly not enough for parking, the driver may make the judgment visually with ease.

The first turning guidance apparatus 210 is coupled to the display device 204. Similar to the first turning guidance apparatus 110, the first turning guidance apparatus 210 is also configured to guide the vehicle to conduct a first turning or, in other words, guide the vehicle into the parking lot. The difference with parallel parking is that, when the angle parking is conducted, the first turning guidance apparatus 210 shows two arcs on the display device 204. These two arcs represent, respectively, the location of the contour of the outer side of the vehicle when the vehicle parks into the parking lot from different direction. Since the external contour of the vehicle is almost straight, or in a slight arc shape in few cases, the radians of these two arcs are relatively small, approximating a straight line. To provide a noticeable prompt to the driver, the two arcs may be shown in a bright color. For instance, in one embodiment, the arcs may be shown in the noticeable green color. The arc displayed by the first turning guidance apparatus 210 changes its position as the vehicle moves. The arc may gradually approach the boundary of the parking lot. When the arc is close enough to the boundary of the parking lot, it means that the location of the contour of the car after the steering wheel reverts back to the center is close to the boundary of the parking lot. Then, the second turning guidance apparatus 212 may enter the working status.

The second turning guidance apparatus 212 coupled to the display device 204 is configured to guide the vehicle to conduct a second turning, i.e., a face-front process where part of the vehicle is already in the parking lot. The second turning guidance apparatus 210 displays on the display device 204 a parking track with distance indication. In one embodiment, the parking track may vary as the steering wheel changes its direction. The display of the parking track with distance indication, which varies as the steering wheel changes its direction, is known in the art. Applicant of the present application also discloses, in utility model application No. 200920008222.2, a technique for displaying a parking track with distance indication which varies as the steering wheel changes its direction. No matter the technique proposed by the applicant or other technique for displaying a parking track with distance indication which varies as the steering wheel changes its direction, these techniques are all applicable to the second turning guidance apparatus 212.

To further offer the driver with a visual experience, the parking guidance system also includes a top view display apparatus 214. The top view display apparatus 214 provides a top view image. The top view display apparatus 214 is coupled to the display device 204 and further coupled to a series of detection devices such as radar, camera, which are mounted around the car. The top view display apparatus 214 detects the location and size of the objects near the vehicle, and the size of the space which can be utilized. Then, these are shown on the display apparatus 204 in a top view. The top view display apparatus 214 may also detect the current posture of the vehicle by detecting the angle of the steering wheel. Similarly, this is shown on the display apparatus 204 in a top view. During the movement of the vehicle, the top view display apparatus 214 may display the whole process of the movement of the vehicle in a top view, which offers the driver with a better visual experience.

Angle Parking Guiding Process

Description is made to the angle parking guiding process which unitizes the parking guidance system according to the present disclosure with connection to the following references.

The vehicle is ready to start parallel parking to enter an angled parking lot. The camera starts to operate. The display device displays the image showing environment behind the vehicle. The references disclose the images displayed on the display device. In the references, the display screen of the display device is divided into two main sections. The left section displays the image captured by the camera. The right section displays the posture of the vehicle and neighboring obstacles in top view by the top view display apparatus. It is to be noted that since the principle of information collection is different, the image captured by the camera reflects an actual scene, whereas the image displayed by the top view display apparatus is an illustrative view.

Figure 13A:
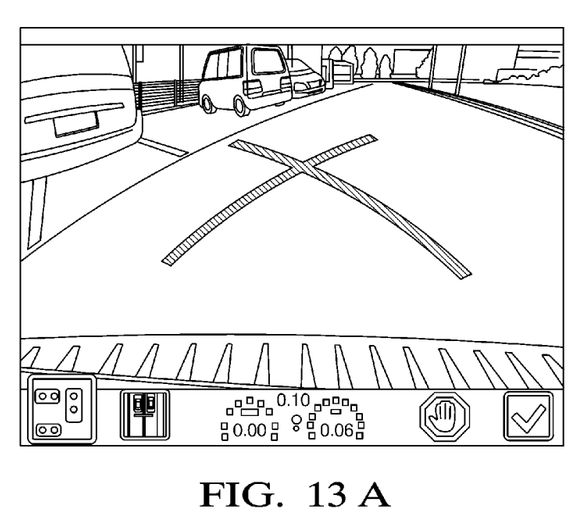
FIGS. 13A and 14A illustrate the content displayed in a perspective view on a display device when a first turning guidance apparatus is operating.
Figure 13B:
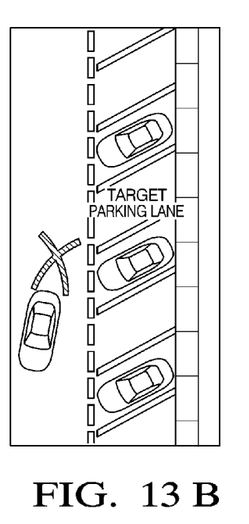
FIG. 13B illustrates the content of FIG. 13A from an overhead perspective.
Figure 14:
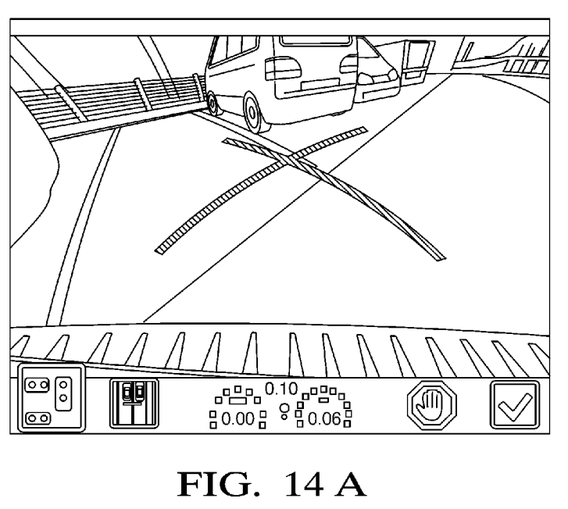
FIG. 14B illustrates the content of FIG. 14A from an overhead perspective.

After the parking mode selection apparatus determines that the parking mode is angle parking, it immediately guides the first turning guidance apparatus. The first turning guidance apparatus is used to guide the vehicle to conduct a first turning, or to guide the vehicle to park in the parking lot. As illustrated in FIGS. 13A and 13B, the difference with parallel parking is that, when the angle parking is conducted, the first turning guidance apparatus shows two green arcs on the display device. These two green arcs represent, respectively, the location of the contour of the outer side of the vehicle when the vehicle parks into the parking lot from different direction. The noticeable green arc may give a sufficient prompt to the driver. The arc displayed by the first turning guidance apparatus changes its position as the vehicle moves. The arc may gradually approach the boundary of the parking lot. When the arc is close enough to the boundary of the parking lot, it means that the location of the contour of the car after the steering wheel reverts back to the center is close to the boundary of the parking lot. In other words, the car is substantially aligned to the parking lot. It is to be noted that the green arc is not the current position where the real contour of the vehicle locates. Rather, it is a prediction of the position where the contour of the vehicle which is close to the curb locates, after the vehicle faces front. For the driver, before the green arc touches the boundary of the parking lot, the driver should keep the steering wheel at its utmost turning angle and should not revert back to the center. When the green arc approaches the boundary of the parking lot closely enough, it means that the first stage of the parking process has been completed and the vehicle needs to face front gradually. FIGS. 14A and 14B disclose the situation when the green arc approaches the curb closely enough. In this process, the top view display apparatus displays on the display device the current posture of the vehicle and its surrounding obstacles. The top view display apparatus similarly displays a top view of the green arc on the display screen in order to offer the driver with a more clear and comprehensive information.

Figure 15:
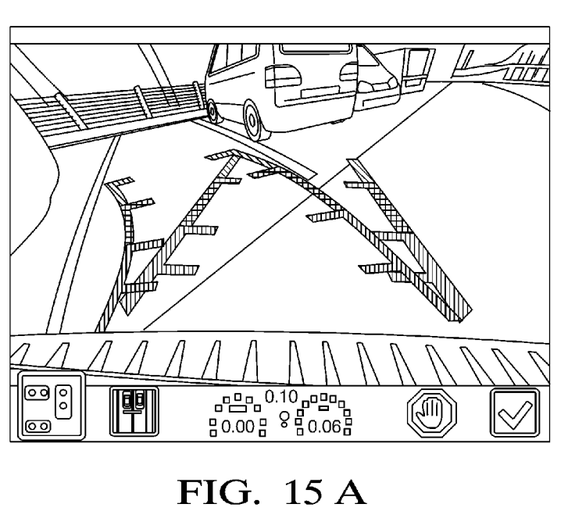
FIGS. 15A and 16A illustrate the content displayed in a perspective view on a display device when a second turning guidance apparatus is operating.
FIG. 15B illustrates the content of FIG. 15A from an overhead perspective.
Figure 16A:
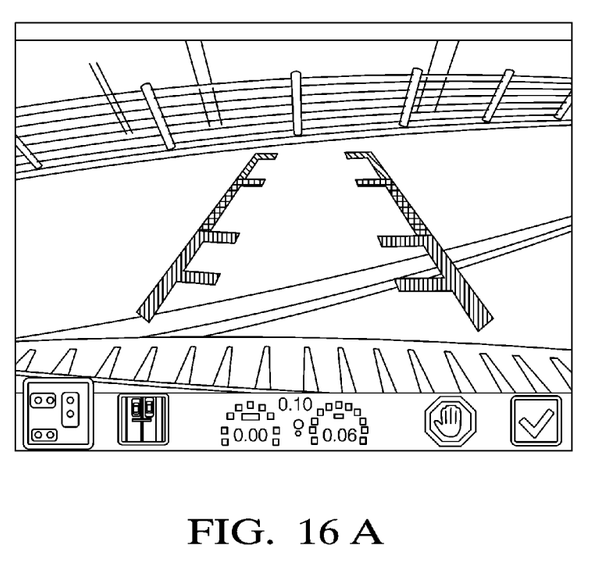
Figure 16B:
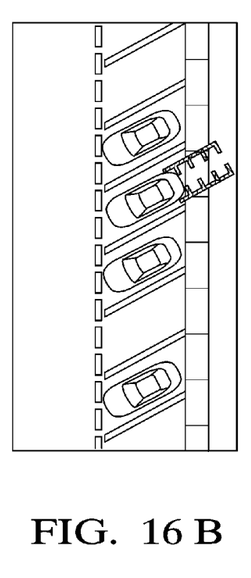
FIG. 16B illustrates the content of FIG. 16A from an overhead perspective.

The second turning guidance apparatus enters working status and starts to guide the vehicle to face front. The second turning guidance apparatus guides the vehicle to conduct a second turning, i.e., a face-front process where part of the vehicle is already in the parking lot. The second turning guidance apparatus displays on the display device a parking track with distance indication. As illustrated in FIGS. 15A and 15B, the parking track may vary as the steering wheel changes it direction. The dashed parking track (in straight line) indicates a straight direction of the rear part of the vehicle, while the solid parking track (in curve) indicates the movement track corresponding to the current direction of the steering wheel. As illustrated in 16A and 16B, the vehicle has completed the face-front process and succeeds in parking the car into the parking lot. In this process, the top view display apparatus displays on the display device the current position of the vehicle and its surrounding obstacles. The top view display apparatus also displays a top view of the parking track on the display screen in order to offer the driver with a more clear and comprehensive information.

In conclusion, the parking guidance system proposed by the present disclosure guides the vehicle to conduct parallel parking or angle parking by providing a series of signs on the display device. With the guidance of these visual signs, the driver is able to complete the parallel parking or angle parking easily and accurately.

The foregoing embodiments are provided to those skilled in the art for implementation or usage of the present disclosure. Various modifications or alternations may be made by those skilled in the art without departing from the spirit of the present disclosure. Therefore, the foregoing embodiments shall not be construed to be limited to the scope of present disclosure. The scope of the present disclosure should be construed as the largest scope in accordance with innovative characters mentioned in the claims.

Apparently, various modifications and variations may be made by those skilled in the art without departing from the spirit and scope of the present invention. Accordingly, the present invention is intended to cover these modifications and variations if these modification and variation according to the present invention fall within the scope of the claims of the present invention and equivalent thereof.

The applicants note that the various surface areas and direction indicating lines described in the specification in terms of distinctive colors have been converted in the drawing figures to equivalent lineation/hatching in accordance with the standards set forth in the official USPTO "Guide for Patent Draftsmen". Refer 37 C.F.R.1.84(n)—Appendix 3-5.

What is claimed is:

1. A passive parking guidance system mounted on a vehicle, comprising:
    a single image camera, mounted at the rear of the vehicle to capture an image showing environment behind the vehicle;
    a display device with a display correction system, wherein the display device is coupled to the camera and is configured to display an image corrected by the display correction system;
    a parking mode selection apparatus coupled to the display device to display a predicted parking area on the display device, wherein the predicted parking area is a fixed area polygon dimensionally fixed as a function of the physical dimensions of said vehicle and positioned within the display image in a fixed predetermined relationship to the vehicle;
    a parking area selection apparatus coupled to the display device to display a parking guidance area on the display device, wherein the parking guidance area is a fixed area polygon dimensionally fixed as a function of the physical dimensions of said vehicle and positioned within the display image in a fixed predetermined relationship to the vehicle;
    a first turning guidance apparatus coupled to the display device to display a fixed preconfigured arc on the display device in a fixed predetermined relationship to the vehicle; and
    a second turning guidance apparatus coupled to the display device to display on the display device a fixed preconfigured parking track with pre-established distance indication superimposed on the image.

2. The system of claim 1, further comprising:
    a top view display apparatus coupled to the display device and further coupled to a series of detection devices which are mounted around the vehicle.

3. The system of claim 2, wherein the display correction system is a fisheye distortion correction system.

4. The system of claim 2, wherein the predicted parking area is quadrangle.

5. The system of claim 2, wherein the parking mode selection apparatus comprises a prompt apparatus coupled to the display device to detect an obstacle within the predicted parking area.

6. The system of claim 5, wherein the prompt apparatus displays the predicted parking area in a different color.

7. The system of claim 2, wherein the parking guidance area is quadrangle.

8. The system of claim 2, wherein the parking area selection apparatus comprises a guidance apparatus coupled to the display device to detect an overlap between the predicted parking area and the parking guidance area.

9. The system of claim 8, wherein the guidance apparatus displays the parking guidance area in a different color.

10. A passive parking guidance system mounted on a vehicle, comprising:
    a single image camera, mounted at the rear of the vehicle to capture an image showing environment behind the vehicle;
    a display device with a display correction system, wherein the display device is coupled to the camera and is configured to display an image corrected by the display correction system;
    a parking mode selection apparatus coupled to the display device;
    a first turning guidance apparatus coupled to the display device to display two fixed preconfigured arcs on the display device in a fixed predetermined relationship to the vehicle; and
    a second turning guidance apparatus coupled to the display device to display on the display device a fixed predetermined parking track with pre-established distance indication superimposed on the image.

11. The system of claim 10, further comprising:
    a top view display apparatus coupled to the display device and further coupled to a series of detection devices which are mounted around the vehicle.

12. The system of claim 11, wherein the display correction system is a fisheye distortion correction system.

13. A passive parking guidance system adapted to be mounted on a vehicle, said guidance system comprising:
    a single image camera including a wide-angle optical lens, adapted for mounting adjacent the rear of the vehicle and operative to capture an image showing an environment behind the vehicle;
    a vehicle operator viewable display device with a display correction system, wherein the display device is coupled to the camera and is configured to display the camera image corrected by the display correction system to substantially delete camera lens-created distortion;

a parking mode selection apparatus coupled to the display device and operative to display a predicted parking area superimposed on the image on the display device, wherein the predicted parking area is configured as a fixed area polygon dimensionally fixed as a function of the physical dimensions of said vehicle and positioned within the display image in a fixed predetermined relationship to the vehicle;

a parking area selection apparatus coupled to the display device and operative to display a parking guidance area superimposed on the image on the display device, wherein the parking guidance area is configured as a fixed area polygon dimensionally fixed as a function of the physical dimensions of said vehicle and positioned within the display image in a fixed predetermined relationship to the vehicle;

a first turning guidance apparatus coupled to the display device and operative to display a fixed preconfigured arc superimposed on the image on the display device in a fixed predetermined relationship to the vehicle; and a second turning guidance apparatus coupled to the display device and operative to display on the display device a fixed preconfigured parking track with a pre-established distance indication superimposed on the image.

* * * * *